(12) United States Patent
Sun et al.

(10) Patent No.: US 7,016,805 B2
(45) Date of Patent: Mar. 21, 2006

(54) METHOD AND APPARATUS FOR ANALYZING A DISTRIBUTION

(75) Inventors: Jie Sun, Cupertino, CA (US); Peng Li, Palo Alto, CA (US); Jan Brian Wilstrup, Mounds View, MN (US)

(73) Assignee: Wavecrest Corporation, Eden Prairie, MN (US)

( * ) Notice: Subject to any disclaimer, the term of this patent is extended or adjusted under 35 U.S.C. 154(b) by 0 days.

(21) Appl. No.: 10/021,895

(22) Filed: Dec. 14, 2001

(65) Prior Publication Data

US 2003/0115017 A1   Jun. 19, 2003

(51) Int. Cl.
    G06F 11/30   (2006.01)

(52) U.S. Cl. .................. 702/181; 702/180; 702/182; 702/69; 375/226; 375/371

(58) Field of Classification Search ............ 702/57, 702/58, 65–67, 181–183, 128, 69, 70, FOR. 108, 702/FOR. 110, FOR. 114, FOR. 134, FOR. 135, 702/FOR. 137, FOR. 164, FOR 166; 700/51, 700/52, 93; 375/130, 226, 355, 356, 371
See application file for complete search history.

(56) References Cited

U.S. PATENT DOCUMENTS

| | | | | |
|---|---|---|---|---|
| 4,539,518 A | * | 9/1985 | Kitayoshi | 324/76.21 |
| 5,057,992 A | * | 10/1991 | Traiger | 700/52 |
| 5,452,333 A | * | 9/1995 | Guo et al. | 375/371 |
| 5,495,409 A | * | 2/1996 | Kanno | 700/79 |
| 5,572,125 A | * | 11/1996 | Dunkel | 324/307 |
| 5,748,491 A | * | 5/1998 | Allison et al. | 702/22 |
| 5,751,852 A | * | 5/1998 | Marimont et al. | 382/180 |
| 5,761,254 A | * | 6/1998 | Behrin | 375/355 |
| 5,987,444 A | * | 11/1999 | Lo | 706/25 |
| 6,028,895 A | * | 2/2000 | Dinsel et al. | 375/235 |
| 6,278,730 B1 | * | 8/2001 | Tsui et al. | 375/224 |
| 6,278,961 B1 | * | 8/2001 | Kadtke et al. | 702/189 |
| 6,298,315 B1 | * | 10/2001 | Li et al. | 702/180 |
| 6,622,117 B1 | * | 9/2003 | Deligne et al. | 702/190 |
| 6,799,144 B1 | * | 9/2004 | Li et al. | 702/180 |
| 6,832,172 B1 | * | 12/2004 | Ward et al. | 702/69 |
| 6,853,933 B1 | * | 2/2005 | Tan et al. | 702/76 |
| 6,888,457 B1 | * | 5/2005 | Wilkinson et al. | 340/540 |
| 2001/0036228 A1 | * | 11/2001 | Skafidas et al. | 375/232 |
| 2001/0044704 A1 | * | 11/2001 | Li et al. | 702/180 |
| 2002/0003843 A1 | * | 1/2002 | Martone | 375/262 |
| 2002/0188429 A1 | * | 12/2002 | Martis | 702/189 |
| 2003/0004664 A1 | * | 1/2003 | Ward et al. | 702/69 |
| 2003/0115017 A1 | * | 6/2003 | Sun et al. | 702/181 |
| 2004/0001194 A1 | * | 1/2004 | Wilstrup et al. | 356/73.1 |
| 2004/0019458 A1 | * | 1/2004 | Jang | 702/182 |
| 2004/0136450 A1 | * | 7/2004 | Guenther | 375/226 |
| 2005/0027477 A1 | * | 2/2005 | Li et al. | 702/181 |
| 2005/0080574 A1 | * | 4/2005 | Draving | 702/69 |
| 2005/0111536 A1 | * | 5/2005 | Cranford et al. | 375/226 |

* cited by examiner

Primary Examiner—Carol S. W. Tsai
(74) Attorney, Agent, or Firm—Merchant & Gould P.C.

(57) ABSTRACT

A method, apparatus, and article of manufacture for analyzing a measurable distribution having random components and deterministic components. The method includes the steps of collecting data, constructing a probability density function based on the data such that the probability density function is a convolution of deterministic functions and random functions, constructing a probability density function based on a deterministic and random convolution model having three or more parameters wherein at least one of the parameters are unknown, and determining unknown parameters by using a deconvolution process.

129 Claims, 9 Drawing Sheets

METHOD AND APPARATUS FOR ANALYZING A DISTRIBUTION

FIELD OF THE INVENTION

The present invention relates to an apparatus for analyzing a distribution. In another aspect, the invention relates to a method for signal analysis.

BACKGROUND OF THE INVENTION

For the last decade, the speed of modem digital electronics has significantly increased. To use SONET as an example, its bit rate quadrupled several times from OC-12 (622 Mbps) to OC-192 (10 Gbps). Currently, OC-768 (40 Gbps) is on the horizon. To use Intel's Pentium family microprocessors as another example, their clock speed was 60 MHz and 66 MHz in 1993 for the original Pentium processors, and it is now 1.4 GHz and 1.5 GHz for the Pentium 4 processors. For such high-speed applications, signal integrity has become an increasingly important issue, among which, jitter remains to be a critical performance criteria.

SUMMARY OF THE INVENTION

In accordance with the present invention, the present invention discloses a method, apparatus, and article of manufacture for analyzing a measurable distribution having random components and deterministic components. The method includes the steps of collecting data, constructing a probability density function based on the data such that the probability density function is a convolution of deterministic functions and random functions, constructing a probability density function based on a deterministic and random convolution model having three or more parameters wherein at least one of the parameters are unknown, and determining unknown parameters by using a deconvolution process.

In one embodiment, at least one random parameter is known and deterministic parameters are determined based on one or more known random parameters through the deconvolution process.

In another embodiment, all of the random parameters are known and the deterministic parameters are determined based on known random parameters through a deconvolution process.

In another embodiment, at least one deterministic parameter is known and random parameters are determined based on the one or more deterministic parameters through a deconvolution process.

In another embodiment, all of the deterministic parameters are known and the random parameters are determined based known deterministic parameters through a deconvolution process.

In another embodiment, none of the parameters are known and the deterministic and random parameters are determined through a deconvolution process.

In yet other embodiments, the distribution is a signal distribution.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

The invention may be more completely understood in consideration of the following detailed description of various embodiments of the invention in connection with the accompanying drawings, in which.

Figure 1:
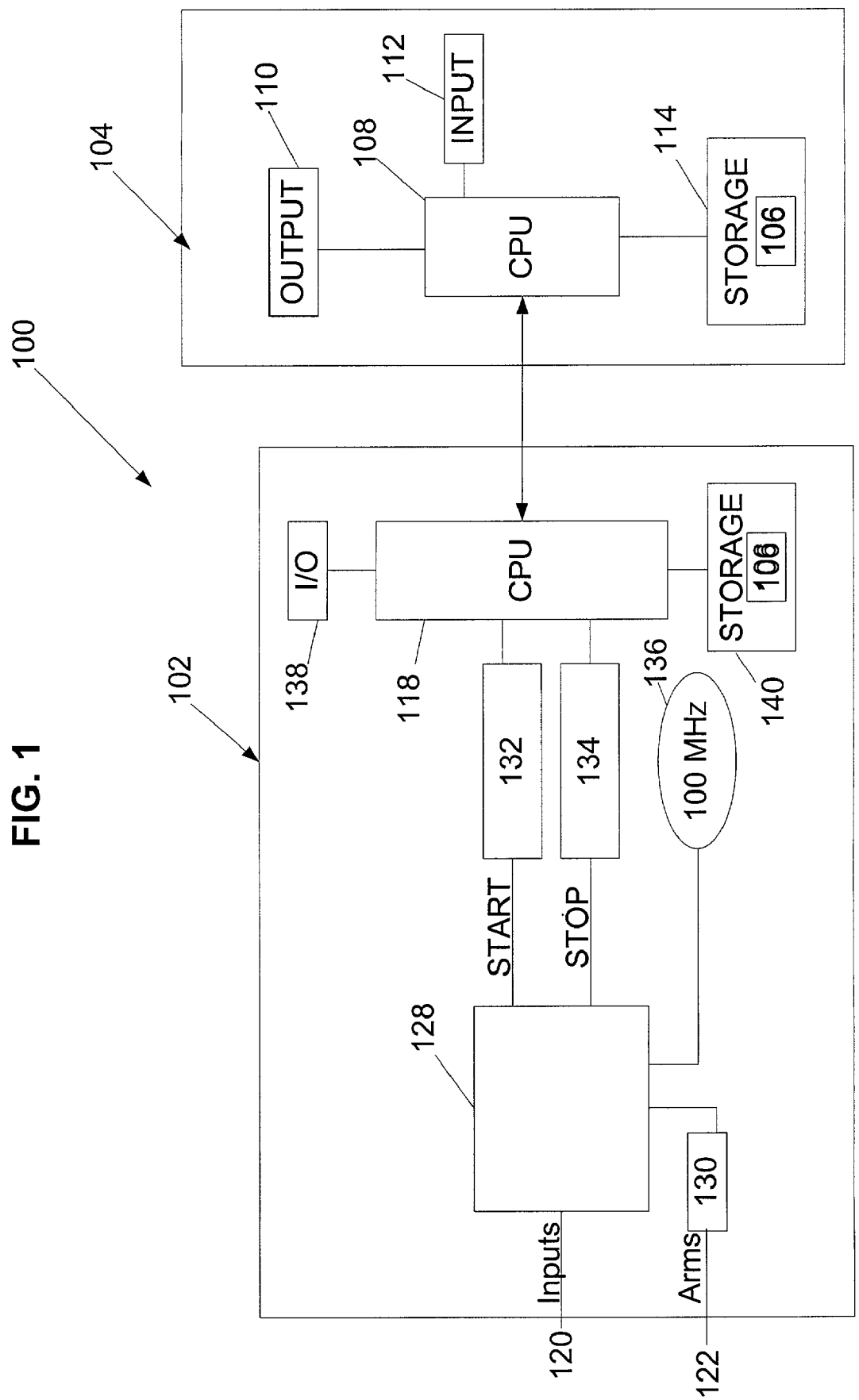
FIG. 1 is an exemplary illustration of a representative hardware environment for a signal analyzing system according an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to methods and devices for analyzing a distribution. The examples below are for jitter analysis. While the present invention is not so limited, an appreciation of various aspects of the invention will be gained through a discussion of the examples provided below.

FIG. 1 is an exemplary illustration of a representative hardware environment for a signal analyzing system 100 according an embodiment of the present invention. A typical configuration may include a measurement apparatus 102 that measures the time interval between two events (start and stop) through counters. A measurement apparatus is disclosed in U.S. Pat. No. 4,908,784, which is hereby incorporated by reference. A typical measurement apparatus is the Wavecrest DTS-2075, available from Wavecrest Corporation, Eden Prairie, Minn.

Those skilled in the art will recognize that other systems that enable signal/distribution analysis that are based on real world measurement (i.e., measurements that are non-ideal or subject to uncertainty) would be applicable. Generally, this would include any product that can act as a distribution source. These devices include an oscilloscope, Automated Test Equipment (ATE), spectrum analyzer, network analyzer, TIA (time interval analyzer), universal time frequency counter, and modulation domain analyzer. Other devices may include a CCD, an x-ray camera, a MRI, and an ultrasound.

The measurement apparatus 102 interfaces to a workstation 104 and operates under the control of an analysis program 106 resident on the workstation 104. The analysis program 106 is typically implemented through data analysis software. One commercially available analysis software is the Wavecrest Virtual Instrument (VI) software, available from Wavecrest Corporation, Eden Prairie, Minn. Other analysis software includes LABVIEW, MathCad, MATLAB, Mathematica, among others. The workstation 104 comprises a processor 108 and a memory including random access memory (RAM), read only memory (ROM), and/or other components. The workstation 104 operates under control of an operating system, such as the UNIX® or the Microsoft® Windows NT operating system, stored in the memory to present data to the user on the output device 110 and to accept and process commands from the user via input device 112, such as a keyboard or mouse.

The analysis program 106 of the present invention is preferably implemented using one or more computer programs or applications executed by the workstation 104. Those skilled in the art will recognize that the functionality of the workstation 104 may be implemented in alternate hardware arrangements, including a configuration where the measurement apparatus 102 includes CPU 118, memory 140, and I/O 138 capable of implementing some or all of the steps performed by the analysis program 106. Generally, the operating system and the computer programs implementing the present invention are tangibly embodied in a computer-readable medium, e.g. one or more data storage devices 114, such as a zip drive, floppy disc drive, hard drive, CD-ROM drive, firmware, or tape drive. However, such programs may also reside on a remote server, personal computer, or other computer device. Computer readable media can be any available media that can be accessed by the computing system. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing system.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The analysis program 106 provides for different measurement/analysis options and measurement sequences. The analysis program 106 interacts with the measurement apparatus 102 through the on-board CPU 118. In one embodiment, the measurement apparatus 102 provides arming/enabling functionality such that the apparatus 102 can measure a signal either synchronously or asynchronously. The signal is fed to the channel input arming/enabling controls 120, 122, 124, and 126 to which event that a measurement is made. Counter/interpolators 128, 130, and 132 measure the time interval between the start and stop events. Interpolators provide fine time resolution down to 0.8 ps. In response to input controls 120, 122, 124, and 126, multiplexer 134 controls the counter/interpolators 128, 130, and 132 based on a clock 136 signal. Clock 136 is typically a precise crystal oscillator.

Those skilled in the art will recognize that the exemplary environment illustrated in FIG. 1 is not intended to limit the present invention. Indeed, those skilled in the art will recognize that other alternative hardware environments may be used without departing from the scope of the present invention.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention.

Figure 2:
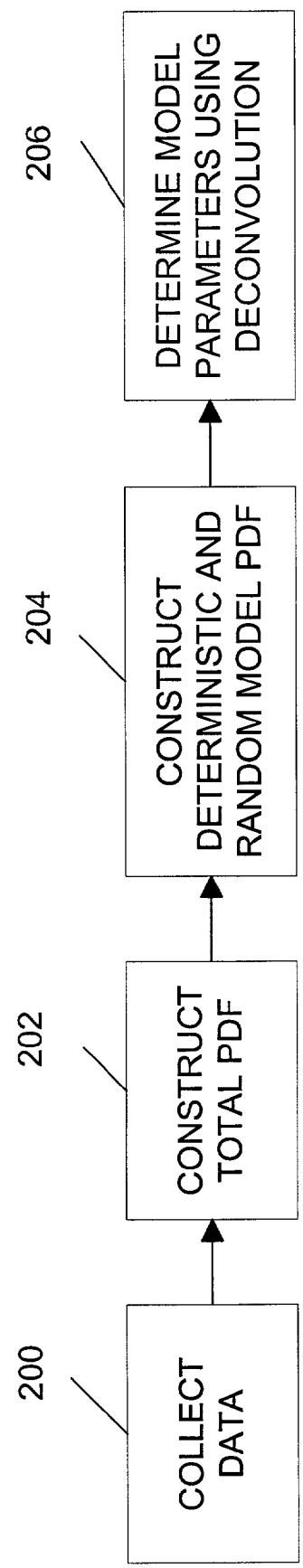
FIG. 2 is a flow diagram illustrating the steps performed by the analysis program determining deterministic and random model parameters using a deconvolution process according to one embodiment of the present invention.

FIG. 2 is a flow diagram illustrating the steps performed by the analysis program 106 determining deterministic and random model parameters using a deconvolution process according to one embodiment of the present invention. The present invention is directed towards analyzing the deterministic and random components of a distribution. In one embodiment of the present invention, the analysis program 106 analyzes the jitter of a signal. In other embodiments, the analysis program can analyze noise associated with other physical quantities including voltage, space, pressure, temperature, velocity, current, frequency, wavelength, power, and energy.

Jitter in serial data communication is a difference of data transition times relative to ideal bit clock active transition times. Jitter in digital systems is the difference between an ideal clock period and an actual clock period. As in all signals, jitter has deterministic and random components. Deterministic jitter (DJ) is bounded in its amplitude and can be measured peak to peak. Random jitter (RJ) is unbounded in its amplitude and Gaussian in nature. Since RJ is probabilistic, it must be quantified by one sigma of standard deviation estimate. RJ is modeled by one or more Gaussian distribution.

Block 200 represents the analysis program 106 collecting data from the measurement apparatus 102. The data may be physically based or model based. Block 202 represents the analysis program 106 constructing a total probability density function (PDF) based on the data such that the PDF function defines a distribution. The distribution is typically a histogram, although other distributions, including distributions that are defined by variable bin widths or a sliding window can be used. The total PDF is typically a convolution of the PDFs of the deterministic components and random components.

Block 204 represents the analysis program 106 constructing PDFs based on a deterministic model and random model having a total of three or more parameters. In some embodiments there is only one random model parameter (sigma). In other embodiments there can be more than one random model parameter. For a signal analysis application, the deterministic model parameters can be time locations and magnitudes of the impulse signals. As described herein, the parameters are measured in the relative sense.

In some embodiments there is only one deterministic time location parameter and two random model parameters and the magnitudes of the deterministic model are assumed to be uniform. In other embodiments there can be more than one deterministic model parameter.

The deconvolution method preferably has three or more total parameters. The number of parameters is calculated using the least number of parameters for the models. For example, a three parameter model can have one deterministic time location parameter, one deterministic relative magnitude parameter, and one random sigma parameter. A three parameter model can also have one deterministic time location parameter and two random sigma parameters.

Figure 9:
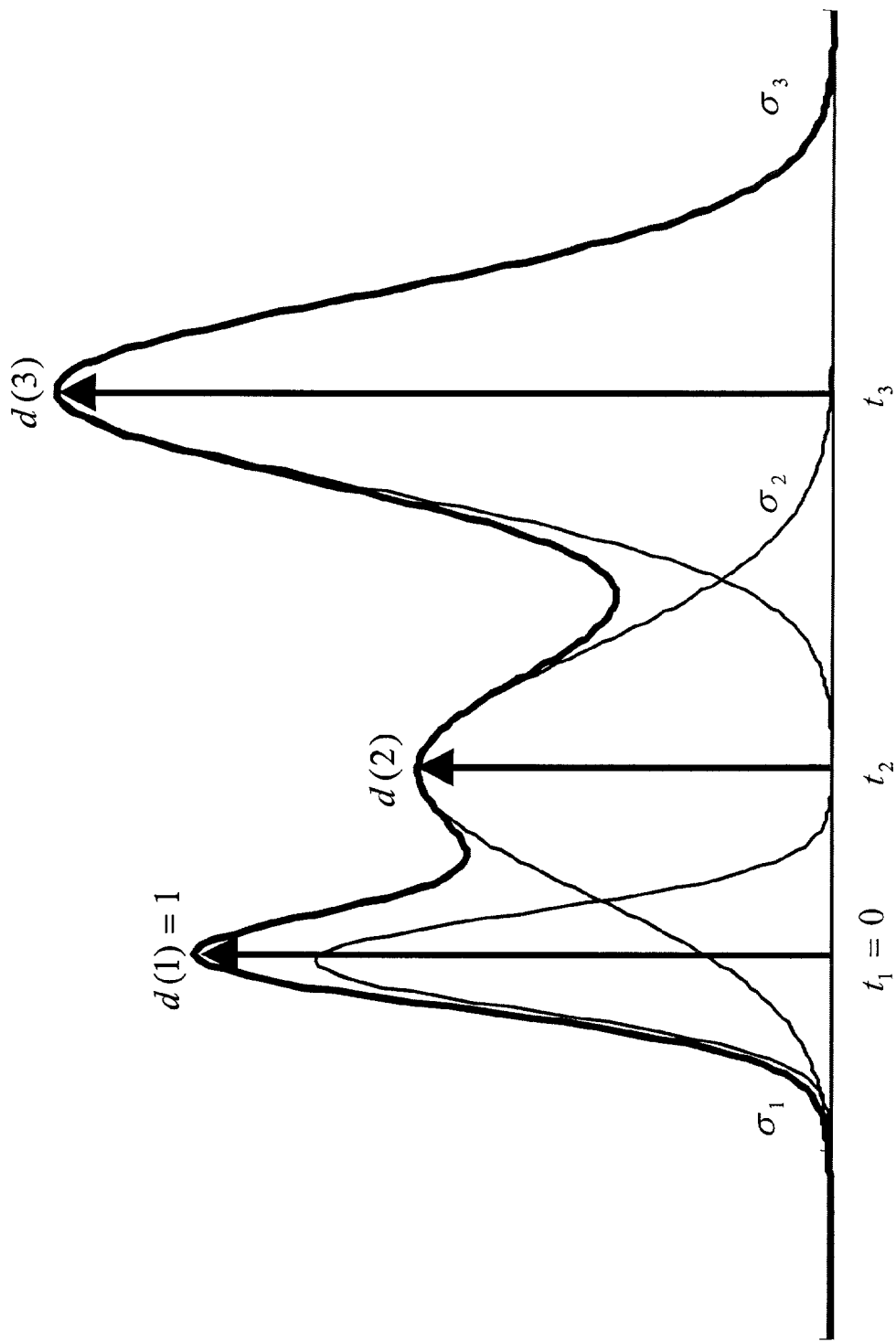
FIG. 9 illustrates a distribution that has seven total deterministic and random model parameters according to one embodiment of this invention.

FIG. 9 illustrates a distribution that has seven total deterministic and random model parameters according to one embodiment of this invention. The deterministic model is composed of three Deltas. The magnitude parameters are $d(2)$ and $d(3)$ where $d(1)=1$. The time parameters are $t_2$ and $t_3$ where $t_1=0$. Thus, the four deterministic parameters are $d(2)$, $d(3)$, $t_2$ and $t_3$. The random model is composed of three normalized Gaussian functions, each has a standard deviation of $\sigma_1$, $\sigma_2$ and $\sigma_3$. Thus, the three random parameters are $\sigma_1$, $\sigma_2$ and $\sigma_3$.

Block 206 represents the analysis program 106 determining the parameters for the deterministic model and random model by using a deconvolution (or decomposition) process.

A total distribution is a convolution (or composition) of the deterministic distribution and the random distribution. In a jitter example, total jitter (TJ) is a convolution of DJ and the RJ. Accordingly, the DJ PDF and the RJ PDF together contribute to the TJ PDF. Once the total PDF is constructed, a deconvolution (or decomposition) process means to determine the DJ PDF and/or the RJ PDF by solving an inverse problem.

Figure 6:
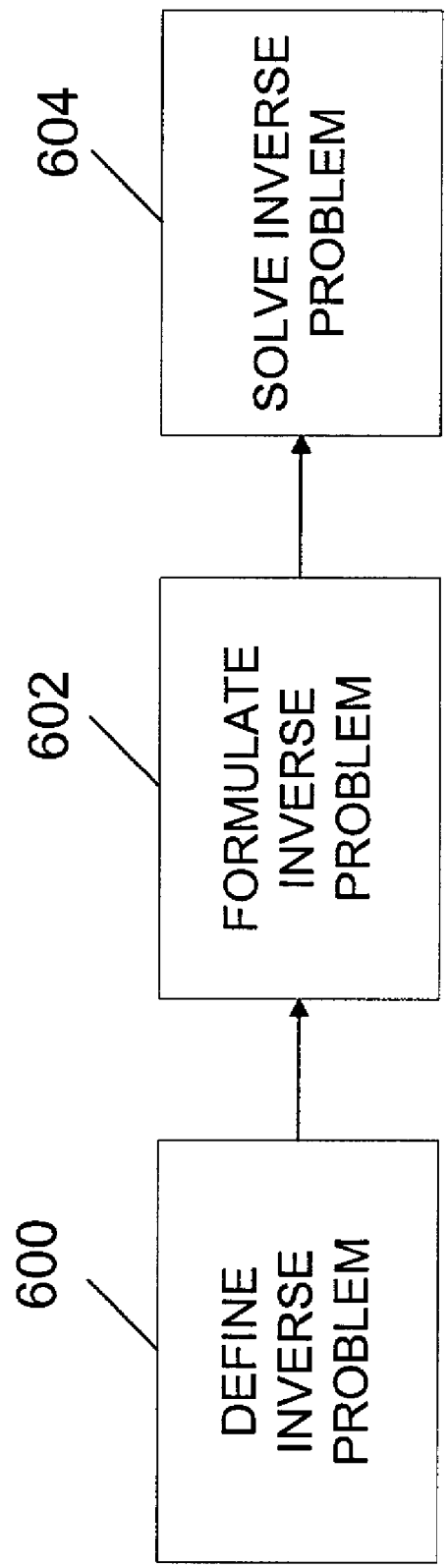
FIG. 6 is a block diagram representing the steps performed by the analysis program in using a deconvolution process.

FIG. 6 is a block diagram representing the steps performed by the analysis program 106 in using a deconvolution process.

Block 600 represents the analysis program 106 defining an inverse problem.

Block 602 represents the analysis program 106 mathematically formulating an inverse problem.

Block 604 represents the analysis program 106 solving an inverse problem.

The problem can be formulated as, for example, a set of linear equations, a convolution/deconvolution, a polynomial division, a transform domain division, and/or other known methods. Approaches to solving the inverse problem include optimizer and non-optimizer procedures, and iterative and non-iterative procedures. The initial data for these procedures can be "unknown" or "partially-known." "Known" refers to the level of knowledge of the model parameters. Generally, it is known that deterministic components are modeled as a multiple delta distribution and random components are modeled as one or more Gaussian distributions. The knowledge can be described as "unknown" or "partially-known" where the deterministic or random parameters are unknown or partially known. In various embodiments according to this invention the knowledge of the parameters in solving the inverse problem can be described as (1) some or all deterministic parameters are known and the random parameters are unknown; (2) deterministic parameters are unknown and some or all random parameters are known; and (3) both deterministic and random parameters are unknown.

In the following, we shall illustrate procedures that can be used to solve the inverse problem. The skill of art will recognize that the limited number of exemplary procedures shown is not intended to limit the present invention. Indeed those skilled in the art will recognize that other procedures can be used without departing from the scope of the present invention.

Let's denote the DJ PDF model as $P_{DJ}(t)$, where:

$$P_{DJ}(t) = \sum_{n=1}^{N} d(n)\delta(t - t_n) \quad (1)$$

In Eq. (1), $d(1)=1, t_1=0$.

Clearly, $t_n$ represents the location of the n th Delta impulse of the DJ PDF, and $P_{DJ}(t_n)=d(n)$ whose associated RJ PDF is denoted as, $$P_{RJ-n}(t) = \frac{1}{\sqrt{2\pi}\,\sigma_n} e^{-\frac{(t-t_n)^2}{2\sigma_n^2}} \quad (2)$$

$t_a, t_N$ represent the first (minimum) and the last (maximum) locations for the DJ PDF, respectively. There is total N Delta impulses to describe the DJ PDF with N−1 independent relative magnitude parameters (not including $d(1)=1$) and N−1 time parameters (not including $t_1=0$). There are a maximum of N standard deviation parameters to describe the RJ PDF.

Let's denote the TJ PDF model as $P_{TJ}(t)$. It is clear that the relationship between TJ PDF and DJ and RJ PDFs can be expressed as $$P_{TJ}(t) = \sum_{n=1}^{N} d(n) P_{RJ-n} \quad (3)$$

$$= \sum_{n=1}^{N} \frac{d(n)}{\sqrt{2\pi}\,\sigma_n} e^{-\frac{(t-t_n)^2}{2\sigma_n^2}}$$

i.e., the TJ PDF is a weighted and shifted sum of multiple Gaussian functions. The measured TJ PDF is denoted as $P_{TJ-M}(t)$.

Procedure 1:

This is the traditional optimizer procedure as is known in the art, which can be used when some or all of the deterministic and/or random model parameters are unknown.

The following illustrates the typical steps involved in this procedure.

Step 1: Assume an initial condition, i.e., for all unknown Delta impulse magnitudes and all unknown Gaussian function standard deviations, we assume certain initial values.

Step 2: Evaluate the TJ PDF model based on Eq. (3) using these initial values.

Step 3: Define an error function based on measured TJ PDF and the calculated TJ PDF, we will minimize this error function as our goal by manipulating the model parameters to achieve a certain accuracy goal.

Step 4: The procedure can be iterative or adaptive. Once the goal is achieved, the model parameters are determined.

For more detail on the optimizer procedure, please refer to references, e.g., Optimization Theory and Applications, D A , Pierre, Dover Publications, Inc., New York, 1986 and Numerical Recipes in C, W H Press, S A Teukolsky, W T Vetterling and B P Flannery, $2^{nd}$, Cambridge Univerisy Press, 1992, both of which are herein incorporated by reference in their entirety.

Procedure 2:

This is a recursive non-optimizer based procedure that can be used when some or all parameters are unknown.

Assume that we further divide the interval between adjacent DJ samples into M bins, and define $$\Delta t = \frac{t_{n+1} - t_n}{M}.$$

Step 1: Consider the first Delta impulse of DJ PDF, i.e., $t=t_1$. We have $$\begin{cases} \frac{d(1)}{\sqrt{2\pi}\,\sigma_1} = P_{TJ-M}(t_1) \\ \frac{d(1)}{\sqrt{2\pi}\,\sigma_1}\exp\left(\frac{\Delta t}{\sqrt{2}\,\sigma_1}\right)^2 = P_{TJ-M}(t_1 - \Delta t) \end{cases} \quad (4)$$

which yields $$\begin{cases} \sigma_1 = \dfrac{\Delta t}{\sqrt{2}\left[\ln\dfrac{P_{TJ-M}(t_1)}{P_{TJ-MI}(t_i - \Delta t)}\right]^{1/2}} \\ d(1) = \dfrac{\sqrt{\pi}\,P_{TJ-M}(t_1)\Delta t}{\left[\ln\dfrac{P_{TJ-M}(t_1)}{P_{TJ-M}(t_1 - \Delta t)}\right]^{1/2}} \end{cases} \quad (5)$$

Step 2: Consider the second Delta impulse of the DJ PDF, i.e., $t=t_2$. We have $$\begin{cases} \frac{d(1)}{\sqrt{2\pi}\,\sigma_1}\exp\left(\frac{\Delta t}{\sqrt{2}\,\sigma_1}\right)^2 + \frac{d(2)}{\sqrt{2\pi}\,\sigma_2}\exp\left(\frac{N\Delta t}{\sqrt{2}\,\sigma_2}\right)^2 = P_{TJ-M}(t_1 + \Delta t) \\ \frac{d(1)}{\sqrt{2\pi}\,\sigma_i}\exp\left(\frac{N\Delta t}{\sqrt{2}\,\sigma_1}\right)^2 + \frac{d(2)}{\sqrt{2\pi}\,\sigma_2} = P_{TJ-M}(t_2) \end{cases} \quad (6)$$

which yields $$\begin{cases} \sigma_2 = \dfrac{N\Delta t}{\sqrt{2}\left[\ln\dfrac{P_{TJ-M}(t_1+\Delta t) - P_{RJ-1}(\Delta t)}{P_{TJ-M}(t_2) - P_{RJ-1}(N\Delta t)}\right]^{1/2}} \\ d(2) = \sqrt{2\pi}\,\sigma_2[P_{TJ-M}(t_2) - P_{RJ-1}(N\Delta t)] \end{cases} \quad (7)$$

Step 3: Consider now the n th Delta impulse of the DJ PDF, i.e., $t=t_n$. We have $$\begin{cases} \sigma_n = \dfrac{N\Delta t}{\sqrt{2}\left[\ln\dfrac{P_{TJ-M}(t_{n-1}+\Delta t) - P_{RJ-(n-1)}(\Delta t)}{P_{TJ-M}(t_n) - P_{RJ-(n-1)}(N\Delta t)}\right]^{1/2}} \\ d(n) = \sqrt{2\pi}\,\sigma_n[P_{TJ-M}(t_n) - P_{RJ-(n-1)}(N\Delta t)] \end{cases} \quad (8)$$

If $P_{TJ-M}(t)$ is in a discrete form, $P_{TJ-M}(t_n)$ can be estimated by linear or polynomial interpolation. It is advantageous for the time spacing of the DJ Delta impulses to be much larger than the RJ sigma values. The process can be repeated for various sampling combinations between two adjacent Deltas and take the average values. The numbers of Deltas and bins do not have to be uniformly distributed.

Procedure 3

This is a non-optimizer based and non-recursive closed procedure that can be used when all of the deterministic parameters or all of the random parameters are known.

In other embodiments, the closed procedure can include, but is not limited to, solving simultaneous equations.

Figure 3:
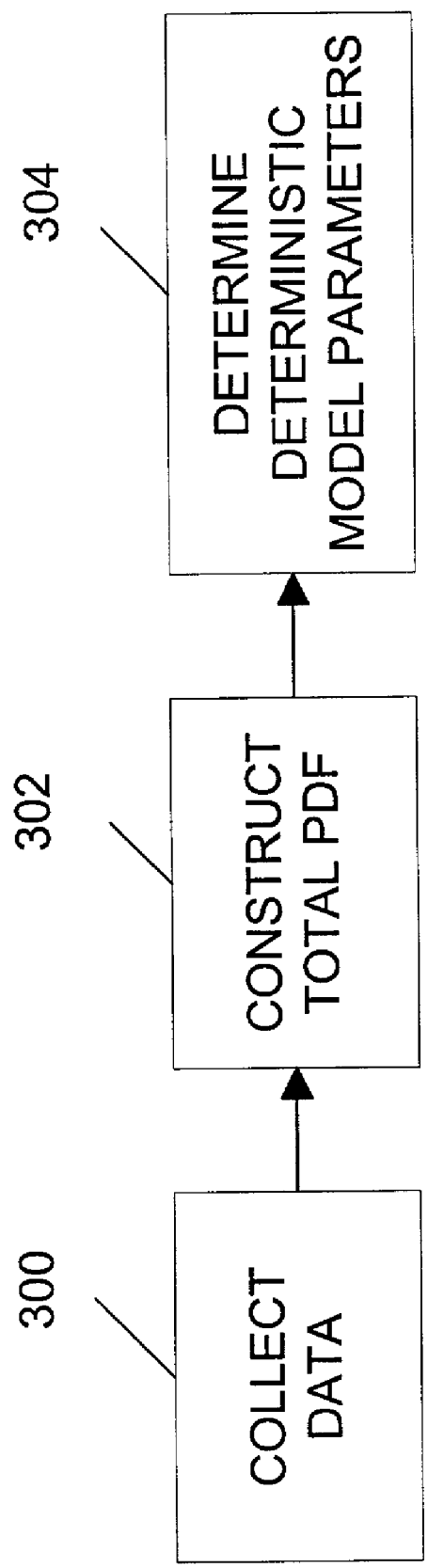
FIG. 3 is a flow diagram illustrating the steps performed by the analysis program in analyzing a distribution according to another embodiment of the present invention.

FIG. 3 is a flow diagram illustrating the steps performed by the analysis program 106 in analyzing a distribution according to another embodiment of the present invention. Block 300 represents the analysis program 106 collecting data from the measurement apparatus 102. The data may be physically based or model based.

Block 302 represents the analysis program 106 constructing a probability density function (PDF) based on the data such that the PDF function defines a distribution. The distribution is typically a histogram, although other distributions, including distributions that are defined by variable bin widths or a sliding window can be used. The PDF is a convolution of deterministic functions and random functions. In this embodiment, the random functions have known parameters. The random parameters can be one sigma or multiple sigmas.

Block 304 represents the analysis program 106 determining deterministic function parameters based on the known random model parameters by using a deconvolution process. In some embodiments there is one known random parameter (sigma). In other embodiments there can be more than one known random parameter. In various embodiments, the deterministic function parameters include impulse signal time locations and magnitudes.

Figure 4:
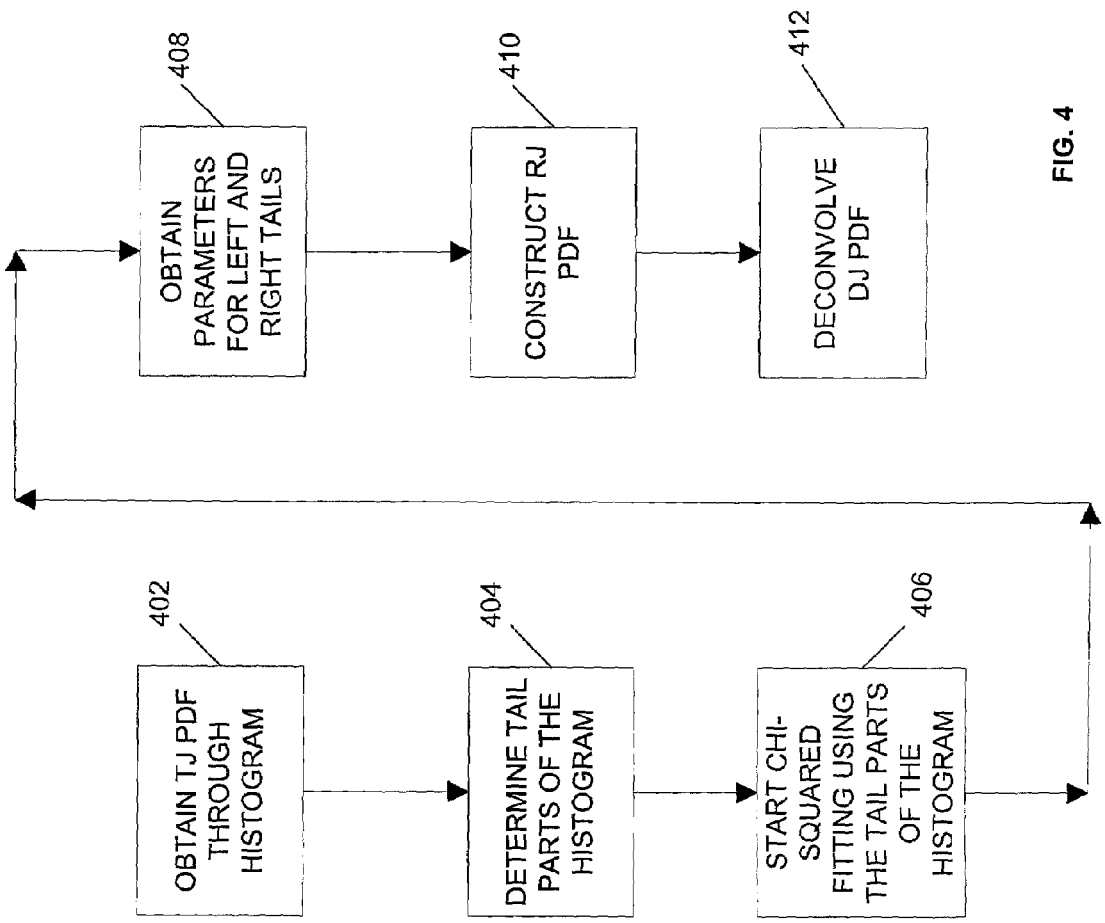
FIG. 4 is a flow diagram illustrating the steps performed by the analysis program in analyzing a distribution according to another embodiment of the present invention.

FIG. 4 is a flow diagram illustrating the steps performed by the analysis program 106 in analyzing a distribution according to another embodiment of the present invention. Block 402 represents the analysis program 106 generating a jitter histogram by calculating the local statistics in each time bin. A histogram is a statistical representation of the distribution of measured physical parameters. The bin size may be fixed or variable for a given distribution. Mathematically, a histogram indicates how the number of measurements change over the measured parameters. The general procedure for generating a histogram is: 1) measurement apparatus 102 measures a signal parameter (for example, period, frequency, duty cycle, etc.) repeatedly to obtain a statistical sample; 2) analysis program 106 sorts the data in a descending (ascending) order; 3) analysis program 106 automatically defines bin sizes, and the total number of measurements that fall into bin ranges is then accumulated; 4) A data set of the number of measurements versus the various measured parameters, namely histogram, can be composed and plotted graphically. Although the present embodiment describes a histogram, the present invention may apply to any kind of distribution. For example, amplitude versus time (waveform), amplitude versus frequency (spectrum), time versus time (jitter time function), time versus frequency (jitter spectrum).

Block 404 represents the analysis program 106 searching and determining the tail parts of the histogram by the first and second order derivative method. The tailparts may be found in any isolated area of the distribution. In the exemplary embodiment, the tailpart distributions start (or end) from the edge of the far left (or right) of the histogram to the first (or last) maximum. Further information can be found in U.S. Pat. No. 6,298,315, which is herein incorporated by reference in its entirety.

Block 406 represents the analysis program 106 starting the $\chi^2$ (chi-squared) method for fitting the tails of the histogram distributions $\chi^2$ is defined as:

$$\chi^2 = \sum_{i=1}^{N} \left( \frac{y_{mod} - y_i}{\Delta y_i} \right)^2 \tag{9}$$

where $y_{mod}$ is the model expected value as defined as:

$$y_{mod} = y_{max} e^{-\left(\frac{x-\mu}{\sqrt{2}\sigma}\right)^2} \tag{10}$$

where $y_{max}$ is the maximum value, $\mu$ is the mean, and $\sigma$ is the standard deviation of a Gaussian function. They are the fitting parameters. $x_i$ and $y_i$ are pairs of data which composite a distribution. (In the case of the histogram, $x_i$ is the measured parameter, $y_i$ is the accumulated events corresponding to $x_i$). $\Delta y_i$ is the error of $y_i$ data. The best fitting parameters will be obtained by minimizing the $\chi^2$. $y_{mod}$ can be any arbitrary function. $\chi^2$ provides accurate model parameter deduction using measurements which are subject to errors and statistical fluctuation.

Block 408 represents the analysis program 106 obtaining the Gaussian distribution parameters. The parameters $\mu$ and $\sigma$ are obtained for the first (left) and second (right) tails of the distribution.

Block 410 represents the analysis program 106 constructing a RJ PDF.

Block 412 represents the analysis program 106 obtaining the PDF for the deterministic component by solving an inverse problem. In one embodiment, a direct time-domain method is used to solve the inverse problem. Those skilled in the art will recognize that other methods can be used without departing from the scope of this invention. For example, an optimization approach, similar to that discussed above, can be used.

If $P_{DJ}$ has a finite length of N, and $P_{RJ}$ has a finite length of M (M>N), then $P_{TJ}$ has a finite length of N+M−1. Clearly, N×Unit Interval (UI) can be used to represent the peak-to-peak value of the deterministic component. Assuming a single Gaussian RJ PDF, Eq. (3) can simply be rewritten as, $$P_{TJ}(l) = t(l) = \sum_{n=1}^{N} d(n) P_{RJ}(l-n) = \sum_{n=1}^{N} d(n) g(l-n) \tag{12}$$

whose matrix form can be written as, $$t = Gd \tag{13}$$

i.e., $$\begin{array}{c} L \times 1 \\ \begin{bmatrix} t(1) \\ t(2) \\ t(3) \\ \vdots \\ t(L) \end{bmatrix} \end{array} = \begin{array}{c} L \times N \\ \begin{bmatrix} g(1) & 0 & 0 & \cdots & 0 \\ g(2) & g(1) & 0 & \cdots & 0 \\ g(3) & g(2) & g(1) & \cdots & 0 \\ \vdots & & & & \\ g(N) & g(N-1) & g(N-2) & \cdots & g(1) \\ g(N+1) & g(N) & g(N-1) & \cdots & g(2) \\ \vdots & & & & \\ g(M) & g(M-1) & g(M-2) & \cdots & g(M-N+1) \\ 0 & g(M) & g(M-1) & \cdots & g(M-N+2) \\ \vdots & & & & \vdots \\ 0 & 0 & 0 & \cdots & g(M) \end{bmatrix} \end{array} \begin{array}{c} N \times 1 \\ \begin{bmatrix} d(1) \\ d(2) \\ d(3) \\ \vdots \\ d(N) \end{bmatrix} \end{array} \tag{14}$$

Here we have selected L to be equal to N+M−1, then Eq. (14) represents an over-determined problem. Matrix G is a Toeplitz matrix, and it is clear from Eq. (13) that matrix G is determined by the PDF of the random component.

In one embodiment according to the present invention, a linear equation formulation of the convolution can be used. A PDF estimation for the deterministic component can be obtained by solving Eq. (14).

The property of matrix G is important in solving this problem, in particular, whether there exists an inverse matrix $G^{-1}$ satisfying, $$G^{-1}G = I \qquad (15)$$

where I is a unit diagonal matrix, so that we can obtain a true solution to Eq. (13), i.e., $$d = G^{-1}t \qquad (16)$$

However, it is unrealistic to count on the fact that the inverse matrix of G always exists, and most likely, the matrix G is ill conditioned, if not singular. Without considering whether matrix G has an inverse or not, a simple pseudoinverse approach can be used.

Given a L×N matrix G, let's define a N×L matrix $G^+$ that is the pseudoinverse for G. Assuming the inverse of (G'G) exists, then $G^+$ is given as $$G^+ = (G'G)^{-1}G' \qquad (17)$$

where G' is the matrix transpose of G. We can obtain, $$d^+ = G^+ t \qquad (18)$$

that is the least-squares solution to Eq. (7), i.e. $d^+$ satisfies, $$\min_d \| t - Gd \| \qquad (19)$$

by manipulating d. A pseudoinverse is also called the Moore-Penrose generalized matrix inverse. Eq. (18) is a best-approximated solution to Eq. (13), which is also called the shortest length least squares solution, the minimum-norm least-squares solution or the minimum Frobenius (Euclidean) norm solution.

If the inverse matrix of G exists, pseudoinverse is simply an expensive way to calculate the direct matrix inverse, i.e., in this case, the bottom line is that pseudoinverse can still be used to calculate $G^{-1}$. On the other hand, if the inverse matrix G does not exist, we can always obtain $G^+$ which has some of, but not all, the properties of $G^{-1}$.

(G'G) is an autocorrelation matrix and can be ill conditioned. In some embodiments, white noise can be added to the diagonal elements of the matrix to stabilize the solution, as is known to those of ordinary skill in the art. In one embodiment, a constant that is equal to 1% (η) of the diagonal value of the autocorrelation matrix (G'G) is added to each of the diagonal elements before the matrix inverse.

Eq. (18) can be utilized to obtain a stable solution only if there is no noise in the measurements. We propose that the raw TJ PDF data should be preprocessed for noise reduction before using the above algorithm, for example a sub-space noise reduction as described in the following example. For further information, please see references, e.g., "Fully Adaptive SVD-based noise removal for robust speech recognition," K Hermus, I Dologlou, P Wambacq and D V Compernolle, Proc. EuroSpeech 99, vol. V, Budapest, Hungary. September, 1999, pages: 1951–1954 and Mathematical Methods and Algorithms for Signal Processing, T K Moon and W C Stirling, Prentice Hall, Upper Saddle River, N.J. 07458, 2000, which is herein incorporated by reference in its entirety.

Figure 7:
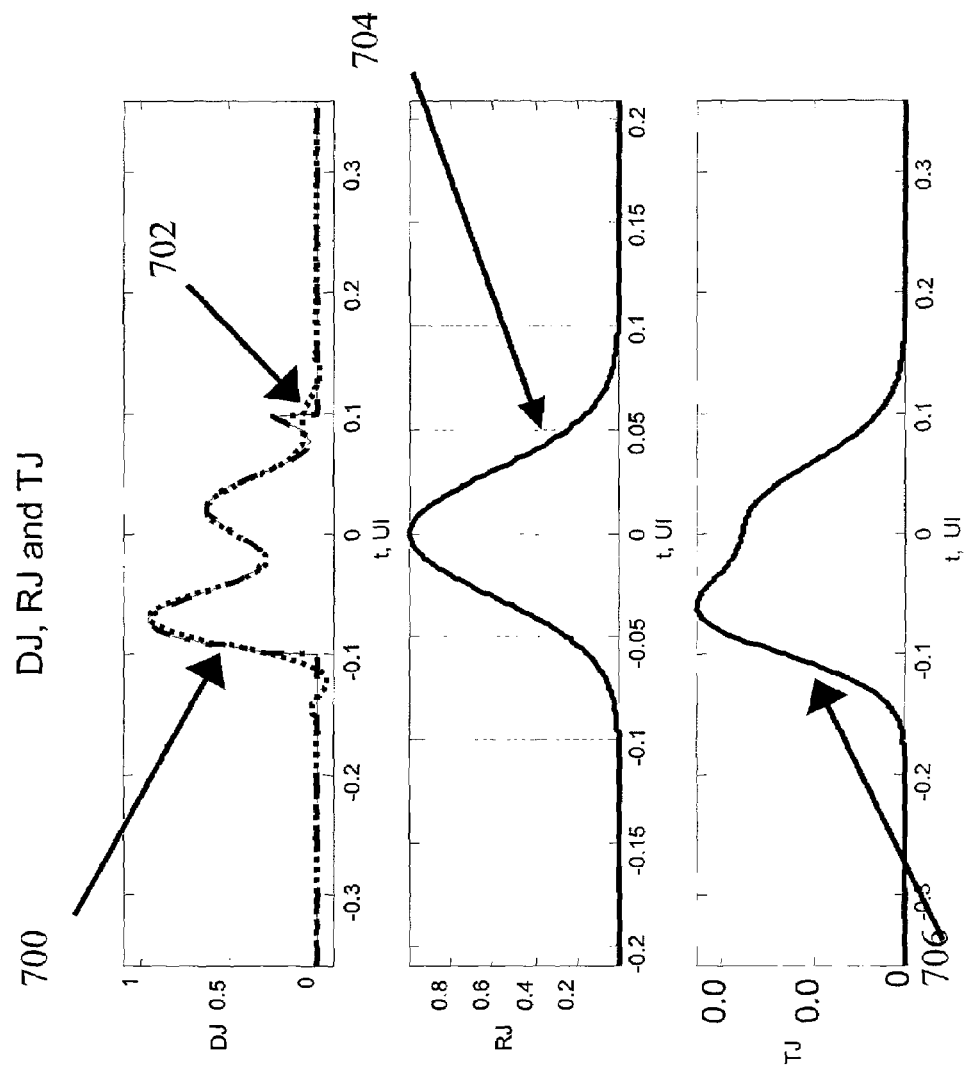
FIG. 7 illustrates a determination of the PDF for the deterministic component under a noiseless case.

FIG. 7 illustrates a determination of the PDF for the deterministic component under a noiseless case in a jitter example. Plot 700 shows the original DJ PDF and the recovered DJ PDF through pseudoinverse, which are indistinguishable. Plot 702 shows the recovered PDF after stabilization. Plot 704 shows a single Gaussian PDF for the random component. Plot 706 shows the TJ PDF.

Figure 8:
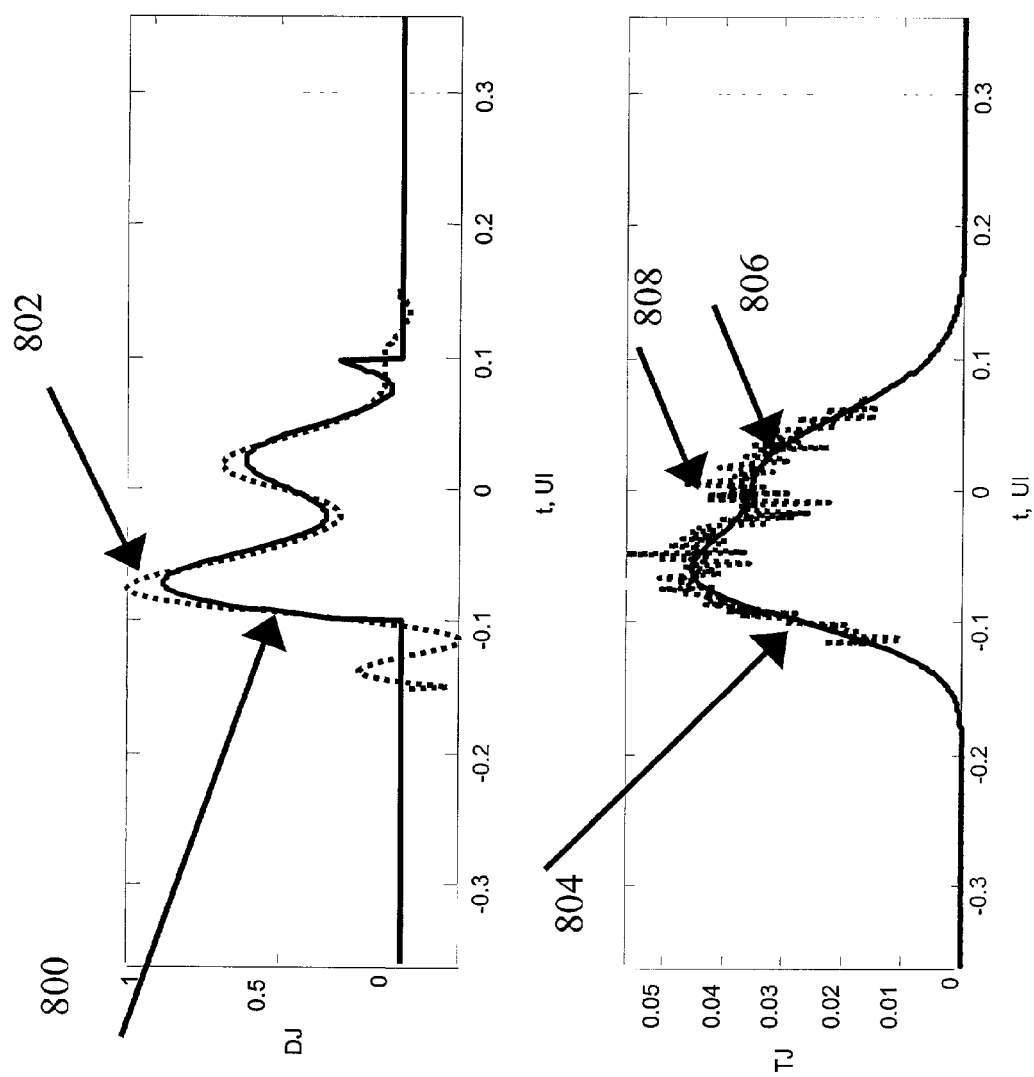
FIG. 8 illustrates a determination of the PDF for the deterministic component under a noisy case.

FIG. 8 illustrates a determination of the PDF for the deterministic component under a noisy case. Plot 800 represents the original PDF for the deterministic component. Plot 802 shows the recovered DJ PDF after stabilization. Plot 804 shows the noiseless TJ PDF. Plot 806 shows the TJ PDF with noise reduction. Plot 808 shows the noisy TJ PDF.

The noise can be generated using a random number generator based on Monte Carlo method, and it has a mean of zero and a standard deviation of 10% of the maximum combined PDF. In order to use the noise reduction algorithm, the noise variance has to be first estimated. In this embodiment, this estimation is performed using the data from the tailfitted segments.

Figure 5:
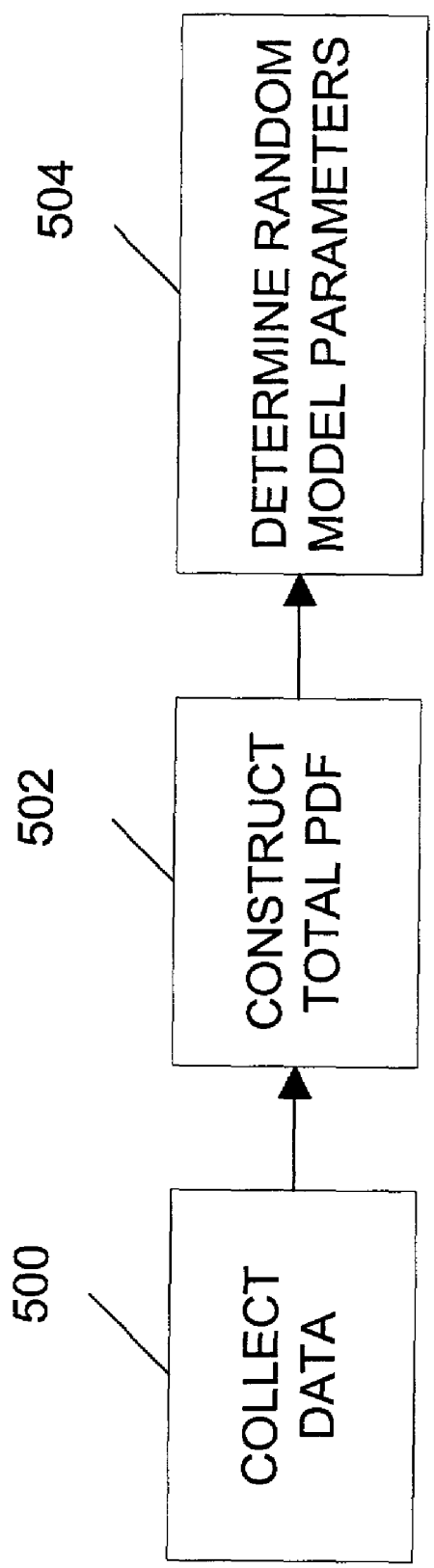
FIG. 5 is a flow diagram illustrating the steps performed by the analysis program in analyzing a distribution according to another embodiment of the present invention.

FIG. 5 is a flow diagram illustrating the steps performed by the analysis program 106 in analyzing a distribution according to another embodiment of the present invention. Block 500 represents the analysis program 106 collecting data from the measurement apparatus 102. The data may be physically based or model based.

Block 502 represents the analysis program 106 constructing a probability density function (PDF) based on the data such that the PDF function defines a distribution. The PDF is a convolution of deterministic functions and random functions. In this embodiment, the deterministic functions have known parameters. In some embodiments, deterministic parameters can include impulse signal time locations and magnitudes.

Block 504 represents the analysis program 106 determining random function parameters based on the known deterministic function parameters by using a deconvolution process.

It will be appreciated that the figures described above represent a methodology, routine, and/or logical flow of program steps which may be implemented to perform the method of the present invention. Other programming steps may be included and such specific logical flow is intended by way of illustration of a preferred routine.

Although the invention has been described in with reference to analyzing time jitter, it is to be understood that the invention defined in the appended claims is not necessarily limited to the jitter examples described herein. As an example, other measurable quantities can be analyzed including, but not limited to, voltage, space, pressure, temperature, velocity, current, frequency, wavelength, power, energy, and financial quantities.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention.

What is claimed is:

1. A method of separating deterministic and random components of signal distortion, comprising the steps of:

(a) collecting data from a data signal;
(b) constructing a probability density function based on the measured data such that the probability density function defines a distribution, wherein the probability density function is a convolution of deterministic functions and random functions;
(c) constructing a probability density function based on a convolution model having three or more parameters wherein at least one of the parameters are unknown, the convolution model having a deterministic model and a random model;
(d) determining unknown parameters by using a deconvolution process employed upon the probability density functions constructed in steps (b) and (c).

2. The method of claim 1, wherein the deterministic model has a deterministic parameter and the random model has two or more random parameters.

3. The method of claim 2, wherein the deterministic parameter is time location.

4. The method of claim 1, wherein the deterministic model has at least one time location parameter and at least one magnitude parameter.

5. The method of claim 1, wherein the determining step comprises the steps of:
formulating an inverse problem; and
solving the inverse problem to extract the parameters.

6. The method of claim 5, wherein the inverse problem is solved via a recursive solution.

7. The method of claim 5, wherein the inverse problem is solved via an optimizer based solution.

8. The method of claim 1, wherein the distribution is a signal distribution.

9. The method of claim 1, wherein all of the parameters are unknown.

10. The method of claim 1, wherein at least one random model parameter is known, wherein the determining step further comprises the step of:
determining a deterministic model parameter based on the known random model parameter by using a deconvolution process.

11. The method of claim 10, wherein the deterministic model has a deterministic parameter and the random model has two or more random parameters.

12. The method of claim 11, wherein the deterministic parameter is time location.

13. The method of claim 10, wherein the deterministic model has a time location parameter and a magnitude parameter.

14. The method of claim 10, wherein the determining step comprises the steps of:
formulating an inverse problem; and
solving the inverse problem to extract the parameters.

15. The method of claim 14, wherein the inverse problem is solved via a recursive solution.

16. The method of claim 14, wherein the inverse problem is solved via an optimizer solution.

17. The method of claim 10, wherein the distribution is a signal distribution.

18. The method of claim 10, wherein all of the random parameters are known.

19. The method of claim 18, wherein the determining step comprises the steps of:
formulating an inverse problem; and
solving the inverse problem to extract the parameters.

20. The method of claim 19, wherein the inverse problem is solved via a closed solution.

21. The method of claim 1, wherein at least one deterministic model parameter is known, wherein the determining step further comprises the step of:
determining the random model parameter based on known deterministic model parameters by using a deconvolution process.

22. The method of claim 21, wherein the deterministic model has a deterministic parameter and the random model has two or more random parameters.

23. The method of claim 22, wherein the deterministic parameter is time location.

24. The method of claim 21, wherein the deterministic model has a time location parameter and a magnitude parameter.

25. The method of claim 21, wherein the determining step comprises the steps of:
formulating an inverse problem; and
solving the inverse problem to extract the parameters.

26. The method of claim 25, wherein the inverse problem is solved via a recursive solution.

27. The method of claim 25, wherein the inverse problem is solved via an optimizer solution.

28. The method of claim 21, wherein the distribution is a signal distribution.

29. The method of claim 21, wherein all of the deterministic parameters are known.

30. The method of claim 29, wherein the determining step comprises the steps of:
formulating an inverse problem; and
solving the inverse problem to extract the parameters.

31. The method of claim 30, wherein the inverse problem is solved via a closed solution.

32. An apparatus for separating deterministic and random components of signal distortion, the apparatus comprising:
(a) a measurement apparatus for collecting data from a data signal;
(b) an analyzing unit, operatively connected to the measurement apparatus, for collecting data from the measurement apparatus, for constructing a probability density function based on the data such that the probability density function defines a distribution, wherein the probability density function is a convolution of deterministic functions and random functions; construct a probability density function based on a convolution model having three or more parameters wherein at least one of the parameters are unknown, the convolution model having a deterministic model and a random model; and determining unknown parameters by using a deconvolution process employed upon the probability density function based on the data and the probability density function based on the convolution model.

33. The apparatus of claim 32, wherein the deterministic model has a deterministic parameter and the random model has two or more random parameters.

34. The apparatus of claim 33, wherein the deterministic parameter is time location.

35. The apparatus of claim 32, wherein the deterministic model has at least one time location parameter and at least one magnitude parameter.

36. The apparatus of claim 32, wherein the analyzing unit formulates an inverse problem and solves the inverse problem to extract the parameters.

37. The apparatus of claim 36, wherein the inverse problem is solved via a recursive solution.

38. The apparatus of claim 36, wherein the inverse problem is solved via an optimizer based solution.

39. The apparatus of claim 32, wherein the distribution is a signal distribution.

40. The apparatus of claim 32, wherein all of the parameters are unknown.

41. The apparatus of claim 32, wherein at least one random model parameter is known, wherein the analyzing unit determines a deterministic model parameter based on the known random model parameter by using a deconvolution process.

42. The apparatus of claim 41, wherein the deterministic model has a deterministic parameter and the random model has two or more random parameters.

43. The apparatus of claim 42, wherein the deterministic parameter is time location.

44. The apparatus of claim 41, wherein the deterministic model has a time location parameter and a magnitude parameter.

45. The apparatus of claim 41, wherein the analyzing unit formulates an inverse problem; and solves the inverse problem to extract the parameters.

46. The apparatus of claim 45, wherein the inverse problem is solved via a recursive solution.

47. The apparatus of claim 45, wherein the inverse problem is solved via an optimizer solution.

48. The apparatus of claim 41, wherein the distribution is a signal distribution.

49. The apparatus of claim 41, wherein all of the random parameters are known.

50. The apparatus of claim 49, wherein the analyzing unit formulates an inverse problem and solves the inverse problem to extract the parameters.

51. The apparatus of claim 50, wherein the inverse problem is solved via a closed solution.

52. The apparatus of claim 53, wherein at least one deterministic model parameter is known, wherein the analyzing unit determines the random model parameter based on known deterministic model parameters by using a deconvolution process.

53. The apparatus of claim 52, wherein the deterministic model has a deterministic parameter and the random model has two or more random parameters.

54. The apparatus of claim 53, wherein the deterministic parameter is time location.

55. The apparatus of claim 52, wherein the deterministic model has a time location parameter and a magnitude parameter.

56. The apparatus of claim 52, wherein the analyzing unit formulates an inverse problem and solves the inverse problem to extract the parameters.

57. The apparatus of claim 56, wherein the inverse problem is solved via a recursive solution.

58. The apparatus of claim 56, wherein the inverse problem is solved via an optimizer solution.

59. The apparatus of claim 53, wherein the distribution is a signal distribution.

60. The apparatus of claim 53, wherein all of the deterministic parameters are known.

61. The apparatus of claim 60, wherein the analyzing unit formulates an inverse problem and solves the inverse problem to extract the parameters.

62. The apparatus of claim 61, wherein the inverse problem is solved via a closed solution.

63. An article of manufacture comprising a program storage medium readable by a computer having a memory, the medium tangibly embodying one or more programs of instructions executable by the computer to perform method steps for separating deterministic and random components of signal distortion, the method comprising the steps of:
(a) collecting data from a data signal;
(b) constructing a probability density function based on the data such that the probability density function defines a distribution, wherein the probability density function is a convolution of deterministic functions and random functions;
(c) construct a probability density function based on a convolution model having three or more parameters wherein at least one of the parameters are unknown, the convolution model having a deterministic model and a random model;
(d) determining unknown parameters by using a deconvolution process employed upon the probability density functions constructed in steps (b) and (c).

64. The method of claim 63, wherein the deterministic model has a deterministic parameter and the random model has two or more random parameters.

65. The method of claim 64, wherein the deterministic parameter is time location.

66. The method of claim 63, wherein the deterministic model has at least one time location parameter and at least one magnitude parameter.

67. The method of claim 63, wherein the determining step comprises the steps of:
formulating an inverse problem; and
solving the inverse problem to extract the parameters.

68. The method of claim 67, wherein the inverse problem is solved via a recursive solution.

69. The method of claim 67, wherein the inverse problem is solved via an optimizer based solution.

70. The method of claim 63, wherein the distribution is a signal distribution.

71. The method of claim 63, wherein all of the parameters are unknown.

72. The method of claim 63, wherein at least one random model parameter is known, wherein the determining step further comprises the step of:
determining a deterministic model parameter based on the known random model parameter by using a deconvolution process.

73. The method of claim 72, wherein the deterministic model has a deterministic parameter and the random model has two or more random parameters.

74. The method of claim 73, wherein the deterministic parameter is time location.

75. The method of claim 72, wherein the deterministic model has a time location parameter and a magnitude parameter.

76. The method of claim 72, wherein the determining step comprises the steps of:
formulating an inverse problem; and
solving the inverse problem to extract the parameters.

77. The method of claim 76, wherein the inverse problem is solved via a recursive solution.

78. The method of claim 76, wherein the inverse problem is solved via an optimizer solution.

79. The method of claim 72, wherein the distribution is a signal distribution.

80. The method of claim 72, wherein all of the random parameters are known.

81. The method of claim 80, wherein the determining step comprises the steps of:
formulating an inverse problem; and
solving the inverse problem to extract the parameters.

82. The method of claim 81, wherein the inverse problem is solved via a closed solution.

83. The method of claim 63, wherein at least one deterministic model parameter is known, wherein the determining step further comprises the step of:
determining the random model parameter based on known deterministic model parameters by using a deconvolution process.

84. The method of claim 83, wherein the deterministic model has a deterministic parameter and the random model has two or more random parameters.

85. The method of claim 84, wherein the deterministic parameter is time location.

86. The method of claim 83, wherein the deterministic model has a time location parameter and a magnitude parameter.

87. The method of claim 83, wherein the determining step comprises the steps of:
formulating an inverse problem; and
solving the inverse problem to extract the parameters.

88. The method of claim 87, wherein the inverse problem is solved via a recursive solution.

89. The method of claim 87, wherein the inverse problem is solved via an optimizer solution.

90. The method of claim 83, wherein the distribution is a signal distribution.

91. The method of claim 83, wherein all of the deterministic parameters are known.

92. The method of claim 91, wherein the determining step comprises the steps of:
formulating an inverse problem; and
solving the inverse problem to extract the parameters.

93. The method of claim 92, wherein the inverse problem is solved via a closed solution.

94. A method of separating deterministic and random components of signal distortion in, comprising the steps of:
(a) measuring jitter within a signal;
(b) constructing a probability density function based on the measured jitter such that the probability density function defines a distribution, wherein the probability density function is a convolution of deterministic functions and random functions;
(c) construct a probability density function based on a convolution model having three or more parameters wherein at least one of the parameters are unknown, the convolution model having a deterministic model and a random model;
(d) determining unknown parameters by using a deconvolution process employed upon the probability density functions constructed in steps (b) and (c).

95. The method of claim 94, wherein the determining step comprises the steps of:
formulating an inverse problem; and
solving the inverse problem to extract the parameters.

96. The method of claim 94, wherein at least one random model parameter is known, wherein the determining step further comprises the step of:
determining a deterministic model parameter based on the known random model parameter by using a deconvolution process.

97. The method of claim 94, wherein at least one deterministic model parameter is known, wherein the determining step further comprises the step of:
determining the random model parameter based on known deterministic model parameters by using a deconvolution process.

98. An apparatus for separating deterministic and random components of signal distortion in, the apparatus comprising:
(a) a measurement apparatus for measuring jitter within a signal;
(b) an analyzing unit, operatively connected to the measurement apparatus, for collecting jitter data from the measurement apparatus, for constructing a probability density function based on the data such that the probability density function defines a distribution, wherein the probability density function is a convolution of deterministic functions and random functions; constructing a probability density function based on a convolution model having three or more parameters wherein at least one of the parameters are unknown, the convolution model having a deterministic model and a random model; and determining unknown parameters by using a deconvolution process employed upon the probability density function based on the data and the probability density function based on the convolution model.

99. The apparatus of claim 98, wherein the analyzing unit formulates an inverse problem and solves the inverse problem to extract the parameters.

100. The apparatus of claim 98, wherein at least one random model parameter is known, wherein the analyzing unit determines a deterministic model parameter based on the known random model parameter by using a deconvolution process.

101. An article of manufacture comprising a program storage medium readable by a computer having a memory, the medium tangibly embodying one or more programs of instructions executable by the computer to perform method steps for separating deterministic and random components of signal distortion in, the method comprising the steps of:
(a) measuring jitter within a signal;
(b) constructing a probability density function based on the measured jitter such that the probability density function defines a distribution, wherein the probability density function is a convolution of deterministic functions and random functions;
(c) construct a probability density function based on a convolution model having three or more parameters wherein at least one of the parameters are unknown, the convolution model having a deterministic model and a random model;
(d) determining unknown parameters by using a deconvolution process employed upon the probability density functions constructed in steps (b) and (c).

102. The method of claim 101, wherein the determining step comprises the steps of:
formulating an inverse problem; and
solving the inverse problem to extract the parameters.

103. The method of claim 101, wherein at least one random model parameter is known, wherein the determining step further comprises the step of:
determining a deterministic model parameter based on the known random model parameter by using a deconvolution process.

104. The method of claim 103, wherein the determining step comprises the steps of:
formulating an inverse problem; and
solving the inverse problem to extract the parameters.

105. The method of claim 101, wherein at least one deterministic model parameter is known, wherein the determining step further comprises the step of:

determining the random model parameter based on known deterministic model parameters by using a deconvolution process.

106. A method of separating deterministic and random components of signal distortion in, comprising the steps of:
(a) measuring noise within a signal;
(b) constructing a probability density function based on the measured noise such that the probability density function defines a distribution, wherein the probability density function is a convolution of deterministic functions and random functions;
(c) construct a probability density function based on a convolution model having three or more parameters wherein at least one of the parameters are unknown, the convolution model having a deterministic model and a random model;
(d) determining unknown parameters by using a deconvolution process employed upon the probability density functions constructed in steps (b) and (c).

107. The method of claim 106, wherein the determining step comprises the steps of:
formulating an inverse problem; and
solving the inverse problem to extract the parameters.

108. The method of claim 106, wherein at least one random model parameter is known, wherein the determining step further comprises the step of:
determining a deterministic model parameter based on the known random model parameter by using a deconvolution process.

109. The method of claim 106, wherein at least one deterministic model parameter is known, wherein the determining step further comprises the step of:
determining the random model parameter based on known deterministic model parameters by using a deconvolution process.

110. An apparatus for separating deterministic and random components of signal distortion in, the apparatus comprising:
(a) a measurement apparatus for measuring noise within a signal;
(b) an analyzing unit, operatively connected to the measurement apparatus, for collecting noise data from the measurement apparatus, for constructing a probability density function based on the data such that the probability density function defines a distribution, wherein the probability density function is a convolution of deterministic functions and random functions; construct a probability density function based on a convolution model having three or more parameters wherein at least one of the parameters are unknown, the convolution model having a deterministic model and a random model; and determining unknown parameters by using a deconvolution process employed upon the probability density function based on the data and the probability density function based on the convolution model.

111. The apparatus of claim 110, wherein the analyzing unit formulates an inverse problem and solves the inverse problem to extract the parameters.

112. The apparatus of claim 110, wherein at least one random model parameter is known, wherein the analyzing unit determines a deterministic model parameter based on the known random model parameter by using a deconvolution process.

113. An article of manufacture comprising a program storage medium readable by a computer having a memory, the medium tangibly embodying one or more programs of instructions executable by the computer to perform method steps for separating deterministic and random components of signal distortion in, the method comprising the steps of:
(a) measuring noise within a signal;
(b) constructing a probability density function based on the noise such that the probability density function defines a distribution, wherein the probability density function is a convolution of deterministic functions and random functions;
(c) construct a probability density function based on a convolution model having three or more parameters wherein at least one of the parameters are unknown, the convolution model having a deterministic model and a random model;
(d) determining unknown parameters by using a deconvolution process employed upon the probability density functions constructed in steps (b) and (c).

114. The method of claim 113, wherein the determining step comprises the steps of:
formulating an inverse problem; and
solving the inverse problem to extract the parameters.

115. The method of claim 113, wherein at least one random model parameter is known, wherein the determining step further comprises the step of:
determining a deterministic model parameter based on the known random model parameter by using a deconvolution process.

116. The method of claim 115, wherein the determining step comprises the steps of:
formulating an inverse problem; and
solving the inverse problem to extract the parameters.

117. The method of claim 113, wherein at least one deterministic model parameter is known, wherein the determining step further comprises the step of:
determining the random model parameter based on known deterministic model parameters by using a deconvolution process.

118. A method of separating deterministic and random components of signal distortion, comprising the steps of:
(a) receiving reference data and a data record that is descriptive of a signal;
(b) constructing a probability density function based on the variation between the data record and the reference data such that the probability density function defines a distribution, wherein the probability density function is a convolution of deterministic functions and random functions;
(c) constructing a probability density function based on a convolution model having three or more parameters wherein at least one of the parameters are unknown, the convolution model having a deterministic model and a random model;
(d) determining unknown parameters by using a deconvolution process employed upon the probability density functions constructed in steps (b) and (c).

119. The method of claim 118, wherein the determining step comprises the steps of:
formulating an inverse problem; and
solving the inverse problem to extract the parameters.

120. The method of claim 118, wherein at least one random model parameter is known, wherein the determining step further comprises the step of:
determining a deterministic model parameter based on the known random model parameter by using a deconvolution process.

121. The method of claim 118, wherein at least one deterministic model parameter is known, wherein the determining step further comprises the step of:

determining the random model parameter based on known deterministic model parameters by using a deconvolution process.

122. An apparatus for separating deterministic and random components of signal distortion, the apparatus comprising:

a processing unit operably coupled to a memory device, the memory device having stored therein a set of instructions implementing the following acts (a) receiving reference data and a data record that is descriptive of a signal;

(b) constructing a probability density function based on the variation between the data record and the reference data such that the probability density function defines a distribution, wherein the probability density function is a convolution of deterministic functions and random functions;

(c) constructing a probability density function based on a convolution model having three or more parameters wherein at least one of the parameters are unknown, the convolution model having a deterministic model and a random model; and (d) determining unknown parameters by using a deconvolution process employed upon the probability density functions constructed in steps (b) and (c).

123. The apparatus of claim 122, wherein the memory device stores instructions for formulating an inverse problem and solves the inverse problem to extract the parameters.

124. The apparatus of claim 122, wherein at least one random model parameter is known, wherein the memory device stores instructions for determining a deterministic model parameter based on the known random model parameter by using a deconvolution process.

125. An article of manufacture comprising a program storage medium readable by a computer having a memory, the medium tangibly embodying one or more programs of instructions executable by the computer to perform method steps for separating deterministic and random components of signal distortion, the method comprising the steps of:

(a) receiving reference data and a data record that is descriptive of a signal;

(b) constructing a probability density function based on the variation between the data record and the reference data such that the probability density function defines a distribution, wherein the probability density function is a convolution of deterministic functions and random functions;

(c) constructing a probability density function based on a convolution model having three or more parameters wherein at least one of the parameters are unknown, the convolution model having a deterministic model and a random model;

(d) determining unknown parameters by using a deconvolution process employed upon the probability density functions constructed in steps (b) and (c).

126. The method of claim 125, wherein the determining step comprises the steps of:

formulating an inverse problem; and solving the inverse problem to extract the parameters.

127. The method of claim 125, wherein at least one random model parameter is known, wherein the determining step further comprises the step of:

determining a deterministic model parameter based on the known random model parameter by using a deconvolution process.

128. The method of claim 127, wherein the determining step comprises the steps of:

formulating an inverse problem; and solving the inverse problem to extract the parameters.

129. The method of claim 125, wherein at least one deterministic model parameter is known, wherein the determining step further comprises the step of:

determining the random model parameter based on known deterministic model parameters by using a deconvolution process.

* * * * *